United States Patent
Drewes

(10) Patent No.: US 8,307,958 B2
(45) Date of Patent: Nov. 13, 2012

(54) BRAKE SUPPORT PLATE

(75) Inventor: Olaf Drewes, Aschaffenburg (DE)

(73) Assignee: Saf-Holland GmbH, Bessenbach (DE)

( * ) Notice: Subject to any disclaimer, the term of this patent is extended or adjusted under 35 U.S.C. 154(b) by 903 days.

(21) Appl. No.: 12/063,358

(22) PCT Filed: Aug. 9, 2006

(86) PCT No.: PCT/EP2006/007900
§ 371 (c)(1),
(2), (4) Date: Oct. 10, 2008

(87) PCT Pub. No.: WO2007/020002
PCT Pub. Date: Feb. 22, 2007

(65) Prior Publication Data
US 2009/0120740 A1    May 14, 2009

(51) Int. Cl.
*F16D 65/38* (2006.01)

(52) U.S. Cl. ............ 188/73.39; 188/205 R; 188/206 R; 29/445; 29/894.012

(58) Field of Classification Search ............... 188/73.39, 188/205 R, 206 R; 29/445, 894.012
See application file for complete search history.

(56) References Cited

U.S. PATENT DOCUMENTS

| | | | | |
|---|---|---|---|---|
| 1,810,356 A | * | 6/1931 | Leipert | 188/206 R |
| 3,756,354 A | * | 9/1973 | Clark | 188/77 R |
| 3,945,137 A | * | 3/1976 | Ruttershoff | 37/461 |
| 4,319,668 A | * | 3/1982 | Johnson et al. | 188/72.4 |
| 4,464,127 A | * | 8/1984 | Boudreaux | 440/74 |
| 4,858,998 A | | 8/1989 | Welschof et al. | |
| 5,052,842 A | * | 10/1991 | Janatka | 403/14 |
| 5,417,500 A | * | 5/1995 | Martinie | 384/513 |
| 5,911,425 A | | 6/1999 | Hofmann et al. | |
| 6,145,416 A | * | 11/2000 | Bonniot | 81/177.75 |
| 6,241,266 B1 | * | 6/2001 | Smith et al. | 280/124.116 |
| 6,408,991 B1 | | 6/2002 | Herffurth et al. | |
| 6,926,122 B2 | | 8/2005 | Wittlinger et al. | |
| 7,260,879 B2 | | 8/2007 | Koschinat | |
| 2004/0074713 A1 | | 4/2004 | Beattie | |

FOREIGN PATENT DOCUMENTS

| | | |
|---|---|---|
| DE | 3700564 A1 | 1/1987 |
| DE | 43 03 418 A1 | 2/1993 |
| DE | 43 14311 A1 | 4/1993 |
| DE | 198 55 275 A1 | 1/1998 |
| DE | 200 21 587 U1 | 12/2000 |
| DE | 20119640 U1 | 12/2001 |

OTHER PUBLICATIONS

English Translation of International Preliminary Report on Patentability, Int'l Application No. PCT/EP2006/007900.

* cited by examiner

*Primary Examiner* — Robert A Siconolfi
*Assistant Examiner* — Mariano Sy
(74) *Attorney, Agent, or Firm* — Price Heneveld LLP

(57) ABSTRACT

A brake support plate secures a caliper for disk brakes or the components of a drum brake to a wheel suspension or to a wheel axle. The brake support plate includes an axle opening with a snug-fit section for receiving an axle element, wherein the snug-fit section is slightly smaller than a corresponding section of the axle element. A circumference of the axle opening includes at least one discontinuation, such as, for example, a slot where the snug-fit section can be expanded for assembly. A securing element is disposed in such a manner as to decrease the discontinuation so that the snug-fit section returns to substantially its original size.

3 Claims, 6 Drawing Sheets

BRAKE SUPPORT PLATE

BACKGROUND OF THE INVENTION (1) Field of the Invention

The present invention concerns a brake support plate for mounting on an axle element and fastening of a caliper of disk brakes or the components of a drum brake to the brake support plate.

(2) Description of the Related Art

In the prior art per patent DE 198 55 275 B4, a brake support plate is formed as a single piece with a steering knuckle 4. As a result, the steering knuckle is given a somewhat forked shape. This design has the drawback that, in the case of a clamped single-piece trailing arm and a rigid axle, the trailing arm would not be dismountable, or it would require great expense to dismount it. Furthermore, utility model DE 200 21 587 U 1 discloses a clamped brake support plate, having a pair of bracing elements, which form a form fitting with a square tube profile of a wheel axle. Finally, utility model DE 201 19 640 U 1 discloses a brake support plate with a split clamping ring, which is clamped on one end segment of a slotted axle tube by using a threaded bolt to tighten up the brake support plate. The brake support plate is tacked by spot welds on the axle tube for its positioning. Furthermore, an axle stub is clamped in the end segment of the slotted axle tube by the clamping action of the clamping ring of the brake support plate in the end segment of the axle tube.

SUMMARY OF THE INVENTION

One aspect of the present invention is a clamped brake support plate that can transmit high braking torques and that can be produced cheaply, and a production process for such a brake support plate and a wheel suspension with such a brake support plate.

The present invention includes a brake support plate for the fastening of a caliper for disk brakes or the components of a drum brake to a wheel suspension or a wheel axle. The brake support plate includes an axle opening with a snug fit to receive an axle element, the snug fit having a slightly smaller size (clear width) than a corresponding segment of the axle element, while a periphery of the axle opening has at least one discontinuation, such as a slot, at which the snug fit can be widened for purposes of assembly, and a fastening means, in order to reduce a width of the discontinuation so that the snug fit regains basically its original size.

The fastening means are preferably designed as one or more fastening screw(s) or clamping screw(s). Alternatively, however, other fastening means can also be used, such as a clamping device, clips, or the like.

If the axle opening of the brake support plate has a snug fit with a slightly smaller size than a corresponding segment of the axle element, a frictional connection is achieved over the entire surface of the snug fit, so that the frictional connection can transfer very large forces. In particular, this prevents the frictional connection from only transferring forces at certain points and/or lines, while other segments of the clamping transfer little or no force. This is accomplished, in particular, in that the snug fit regains its original size due to the fastening means, so that the axle element is reduced in its diameter to roughly the slightly smaller size of the snug fit of the brake support plate.

Preferably, the axle opening of the brake support plate is generally round, which corresponds to the usual configuration of the axle element.

Two discontinuations may be arranged, running parallel or at a slant to each other and having an offset with regard to an opening midpoint, so that one segment of the brake support plate encloses the axle element by more than 180 degrees.

Alternately, two discontinuations may be arranged, running parallel to each other, with an imaginary prolongation of the discontinuations running through an opening midpoint of the axle opening, so that two segments of the brake support plate formed by the discontinuations enclose the axle element each by about 180 degrees.

At least one first engaging means or structure may be arranged at a periphery of the axle opening, in order to form basically a form fitting with at least one second complementary engaging means of the axle element.

The first engaging means or structure at the periphery of the axle opening enables an easy positioning of the brake support plate on the axle element. Furthermore, this engaging means or structure has a fail-safe function, i.e., if the frictional connection of the clamped brake support plate fails, the brake support plate is held in place by the form fitting of the engaging means or structure.

The first engaging means or structure may be configured as a recess, which at least partly receives the second engaging means or structure. The recess can have any desired configuration, and the surface geometry can be straight and/or curved.

The first engaging means or structure may be designed as a recess having a generally spherical configuration, in order to at least partly receive a second engaging means that may be a generally spherical structure.

The second engaging means or structure can be configured as a single piece with the axle element. It may also be configured as a separate ball, which is inserted or let into a recess in the axle element. Of course, the second engaging means or structure alternatively can also be configured in the brake support plate, i.e., arranged or secured in the first engaging means, configured as a recess. Moreover, alternatively, the ball (i.e., the second engaging means) can also be configured as a single piece with the brake support plate. Furthermore, a plurality of engaging means, especially balls, can also be provided, which especially preferably are distributed about the circumference of the axle element or the peripheral edge of the brake support plate. Especially preferably, two balls are provided as engaging means, advantageously lying opposite each other.

Thanks to such a configuration, an improved torque transfer between brake support plate and axle element is advantageously created. Moreover, a centering of the brake support plate both in the axial direction and in the tangential direction is made possible.

A plurality of fastening openings may be arranged on the brake support plate, running generally parallel or perpendicular to the axle opening, in order to secure a caliper of disk brakes or the components of a drum brake to the brake support plate, and the fastening openings preferably have a fit for set screws or an inner threading.

The brake support plate may include fork arms, which are arranged at a given distance from each other, in order to install one or all brake linings between the fork arms with form fit.

One diameter of the snug fit of the axle opening is preferably 0.05 mm to 0.5 mm smaller than a diameter of a corresponding segment of an axle element.

Another aspect of the invention is a method for the production of a brake support plate. The method may include production of a brake support plate blank, for example, by casting, with an axle opening to receive an axle element; possible machining of the axle opening, in order to form an even better snug fit; and creation of a discontinuation at the periphery of the axle opening on at least one side, such as in the form of a deliberate breaking or cutting open of the brake support plate.

Due to the breaking of a single-piece brake support plate blank, the brake support plate has a very precise fit. Furthermore, the fabrication is very simple, since only one structural part needs to be cast.

Advantageously, the brake support plate can be interrupted, preferably simultaneously, at two places, in order to make a brake support plate comprising two segments. Preferably, moreover, one engaging means will be formed at one periphery of the axle opening, in order to produce a form fitting with a complementary engaging means of an axle element.

Furthermore, according to the invention, a wheel suspension is created with an axle element and a brake support plate according to the invention, and the wheel suspension preferably has a clamped trailing arm.

The clamped brake support plate of the invention is especially suitable for use on a wheel suspension with a clamped trailing arm, since the brake support plate of the invention is easy to dismount, in order to allow for the mounting or dismounting of the trailing arm.

DESCRIPTION OF THE DRAWINGS

As shown in FIGS. 1 and 2, a brake support plate 1 is forged or cast as a single piece, for example, from gray cast iron, such as GG-60, spherulitic graphite cast iron (GGG), or vermicular graphite cast iron (GGV). A brake support plate 1 of gray cast iron is especially cheap to produce, while a brake support plate 1 of spherulitic graphite cast iron GGG or vermicular graphite cast iron GGV has a greater strength.

Figure 1:
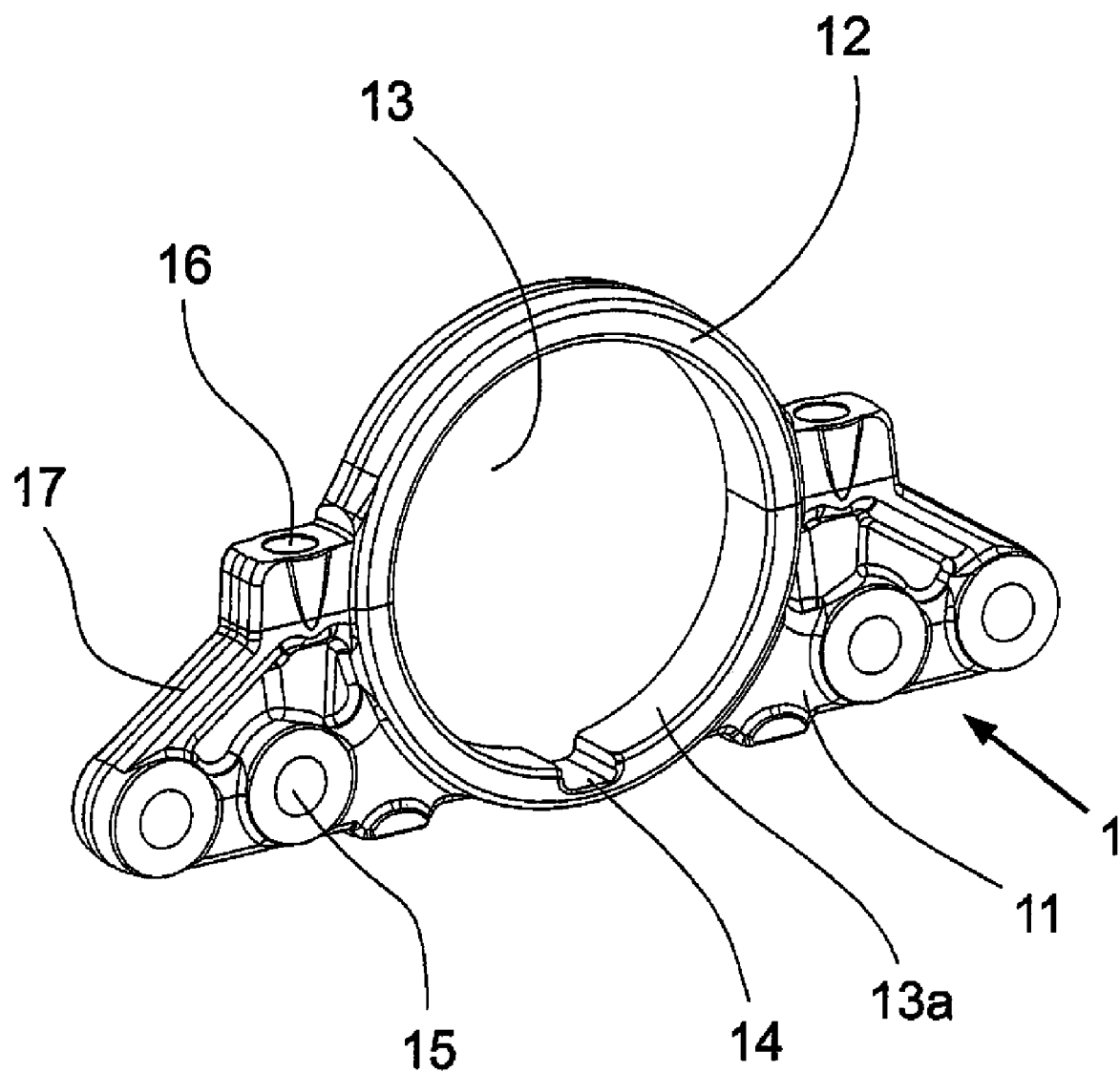
FIG. 1 is an isometric view of a twice broken brake support plate 1 according to one aspect of the present invention.

After the forging or casting, a snug fit of an axle opening 13 is formed in the single piece of cast iron. The snug fit of the axle opening 13 has a slightly smaller size than a corresponding segment of an axle element 5. In particular, the snug fit is preferably round and has a diameter smaller by 0.05 mm to 0.5 mm, preferably 0.1 to 0.3 mm, than a diameter of the corresponding segment of the axle element 5, i.e., a press fit.

After the forging or casting of the one-piece brake support plate 1 and possibly machining the snug fit of the axle opening 13, the one-piece brake support plate 1 is broken or opened by some other technique, such as cutting, on at least one place on its periphery of the axle opening 13. The breaking occurs by deliberate breaking, so-called cracking, at a predetermined position on the periphery of the axle opening 13. In the case of a breaking on one side, the brake support plate 1 remains a single piece and is bent and/or heated at the broken site in order to be mounted on the axle element 5. In the case of two-sided breaking, the brake support plate 1 is broken into two halves 11, 12, which are then mounted from two sides of an axle element 5 and screwed together once again by fastening screws (not shown).

By appropriate choice of the snug fit of the axle opening 13, a clamping is created on the axle element 5, which basically produces a uniform frictional force over the entire circumferential surface of the snug fit of the axle opening 13, so that particularly large braking torques can be transmitted. Furthermore, the cracking produces a very precise fitting at the discontinuation of the peripheral edge 13a of the axle opening 13. An aftertreatment of the fitting surfaces, such as might be necessary at warehouses, can be omitted due to the cracking. As a result, the fabrication expenses of the brake support plate can be reduced.

The brake support plate can also be made from light metal or a light metal alloy, which will reduce the unsuspended masses of the wheel suspension.

In the case of cracking on two sides, one produces a first segment 11 of the brake support plate and a second segment 12 of the brake support plate. The first segment 11 preferably has fastening openings 15, whose axes run parallel or perpendicular to an axis of the axle opening 13. These fastening openings 15 serve to fasten a caliper for disk brakes or to fasten the components of a drum brake to the brake support plate 1. In the first segment 11 of the brake support plate, a thread is configured in a threaded opening 17 and in the second segment 12 of the brake support plate, a corresponding threaded opening 16 is configured for the insertion of a fastening screw (not depicted).

Figure 2:
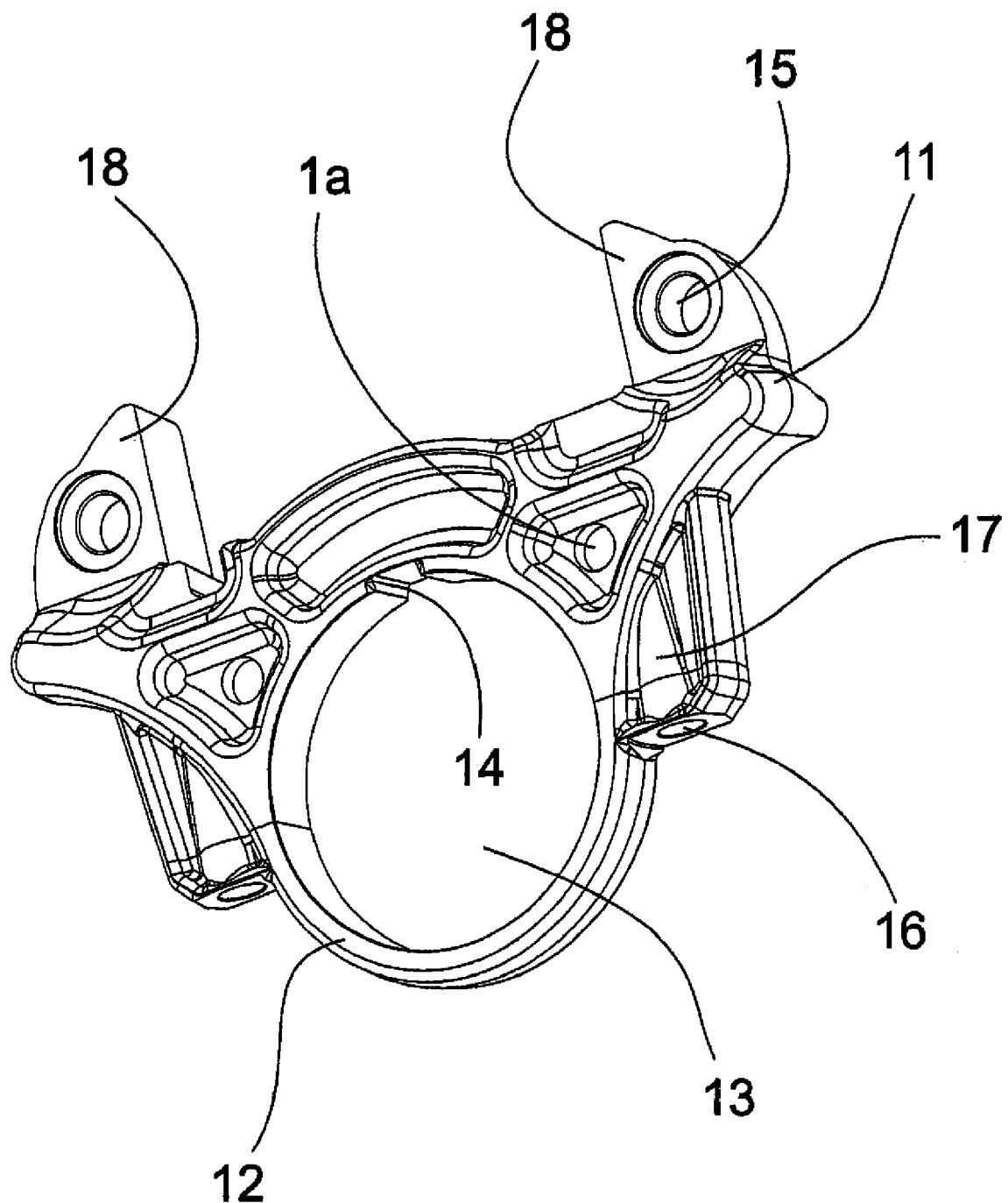
FIG. 2 is an isometric view of a twice divided brake support plate according to another aspect of the present invention including fork arms for arranging a caliper of a disk brake.

In order to produce a form fitting of the brake support plate 1 with the brake lining(s) in a brake support plate for the fastening of a caliper for disk brakes, the brake support plate 1 of a second sample embodiment shown in FIG. 2 has fork arms 18, in the space between which the brake lining(s) can be inserted.

Furthermore, the brake support plate can be provided with recesses 1a, as shown in FIG. 2, in order to reduce the weight of the brake support plate 1 and thus the weight of the unsuspended masses of the wheel suspension.

Figure 3:
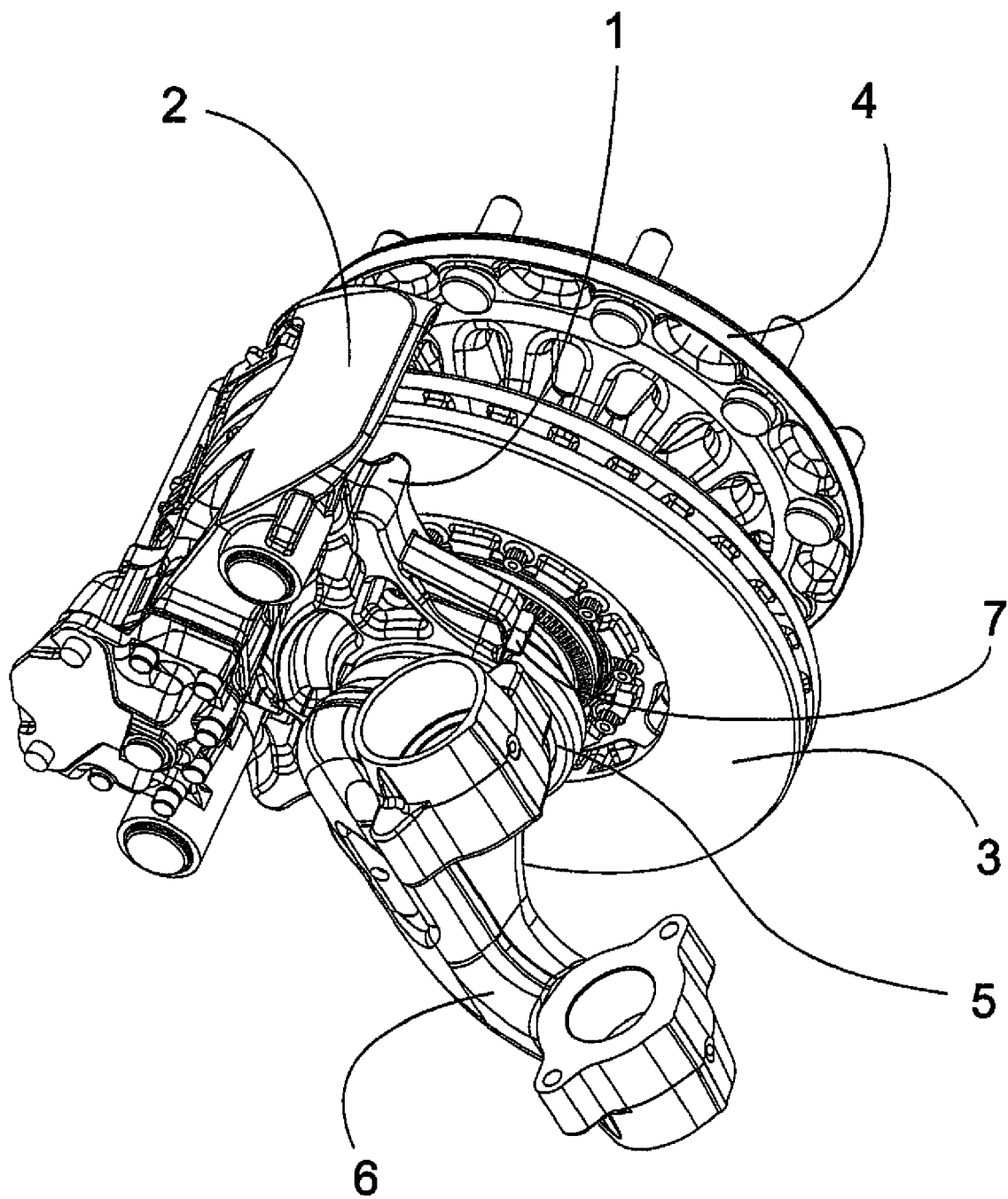
FIG. 3 is an isometric view of a brake support plate according to the present invention installed on an axle element.
Figure 4:
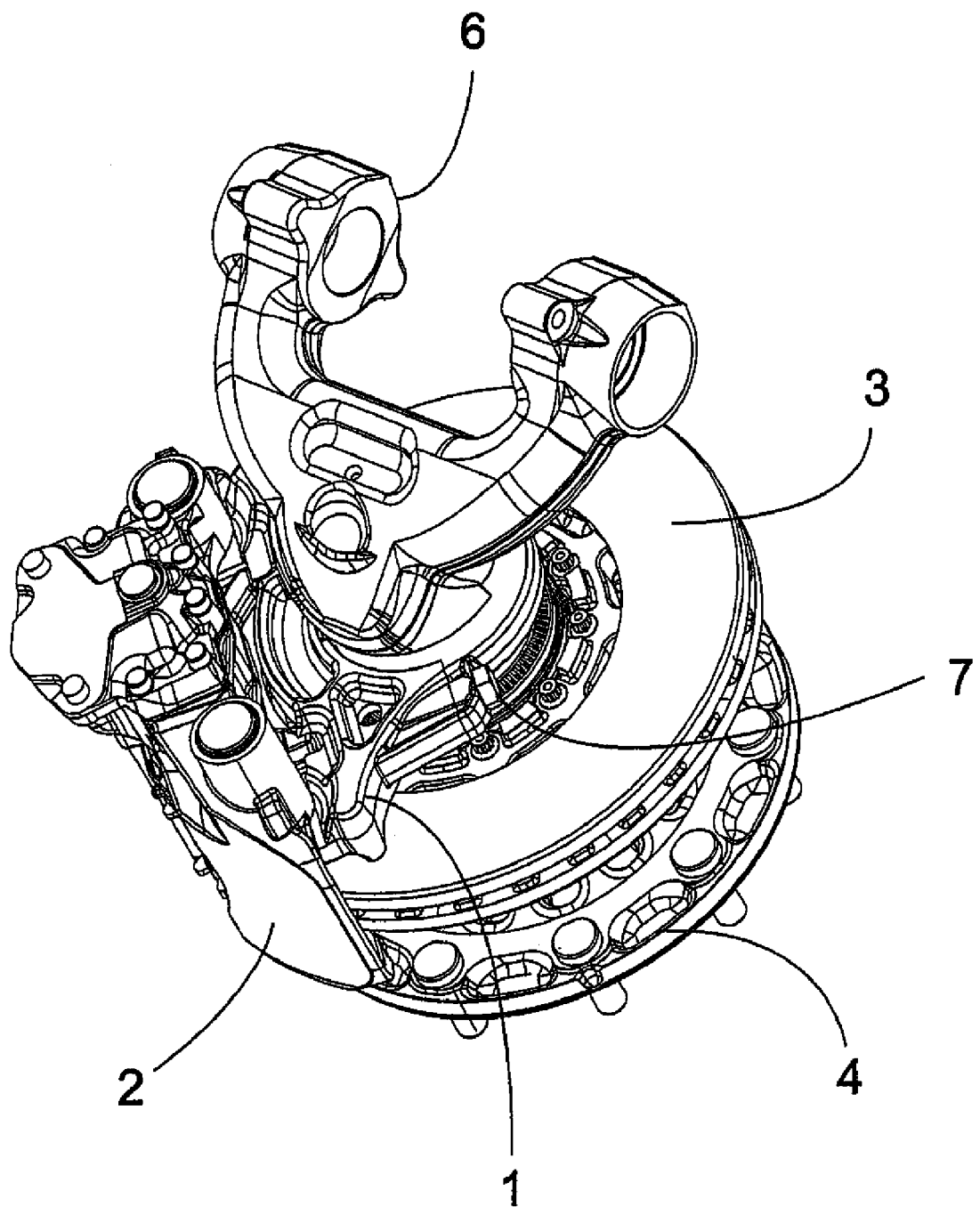
FIG. 4 is an isometric view of a clamped brake support plate installed on an axle element.

The brake support plate 1 of the invention is especially suitable for use on a tubular rigid axle, which is linked to a vehicle frame by means of a pair of trailing arms. However, the use of the brake support plate 1 is not limited to this, but rather the brake support plate of the invention can also be used with an articulated axle, as shown in FIGS. 3 and 4. But if the brake support plate 1 of the invention is used for a rigid axle with a pair of trailing arms, then it is especially easy to dismantle clamped trailing arms when the clamped brake support plate is first dismounted from the axle tube. In other words, the clamped brake support plate 1 of the invention has the benefit that a clamped trailing arm can be easily removed from an axle tube after the dismounting of the clamped brake support plate, so that the replacement of a defective trailing arm is facilitated.

The brake support plate 1 of the invention offers the benefit, in particular, of being easily mountable and dismountable. Furthermore, the fabrication is facilitated, since the entire brake support plate is cast as a single piece. The fitting precision of the discontinuation of the peripheral edge 13a of the axle opening 13 is produced in simple manner and with great precision by cracking. Very large braking torques can be transmitted, since the entire circumference of the axle opening lies uniformly against a corresponding segment of an axle element.

As another benefit, the brake support plate 1 and the axle element 5 can be provided with a rust preventative and a coat of paint, etc., prior to the installation. That is, the brake support plate 1 is merely placed onto the axle element 5 and the fastening screw 7 is tightened. A subsequent treatment of the brake support plate 1 and the axle element 5 after installation is no longer necessary. This can lower the installation expense. Furthermore, repair costs can be kept low when a defective brake support plate 1 needs to be replaced.

The invention is not confined to the sample embodiments shown here. In particular, the two sample embodiments shown here can be combined at will, so that, for example, a brake support plate 1 can also have recesses 1a without the fork arms 18, while a brake support plate 1 with fork arms 18 and no recesses 1a is also conceivable.

Figure 5:
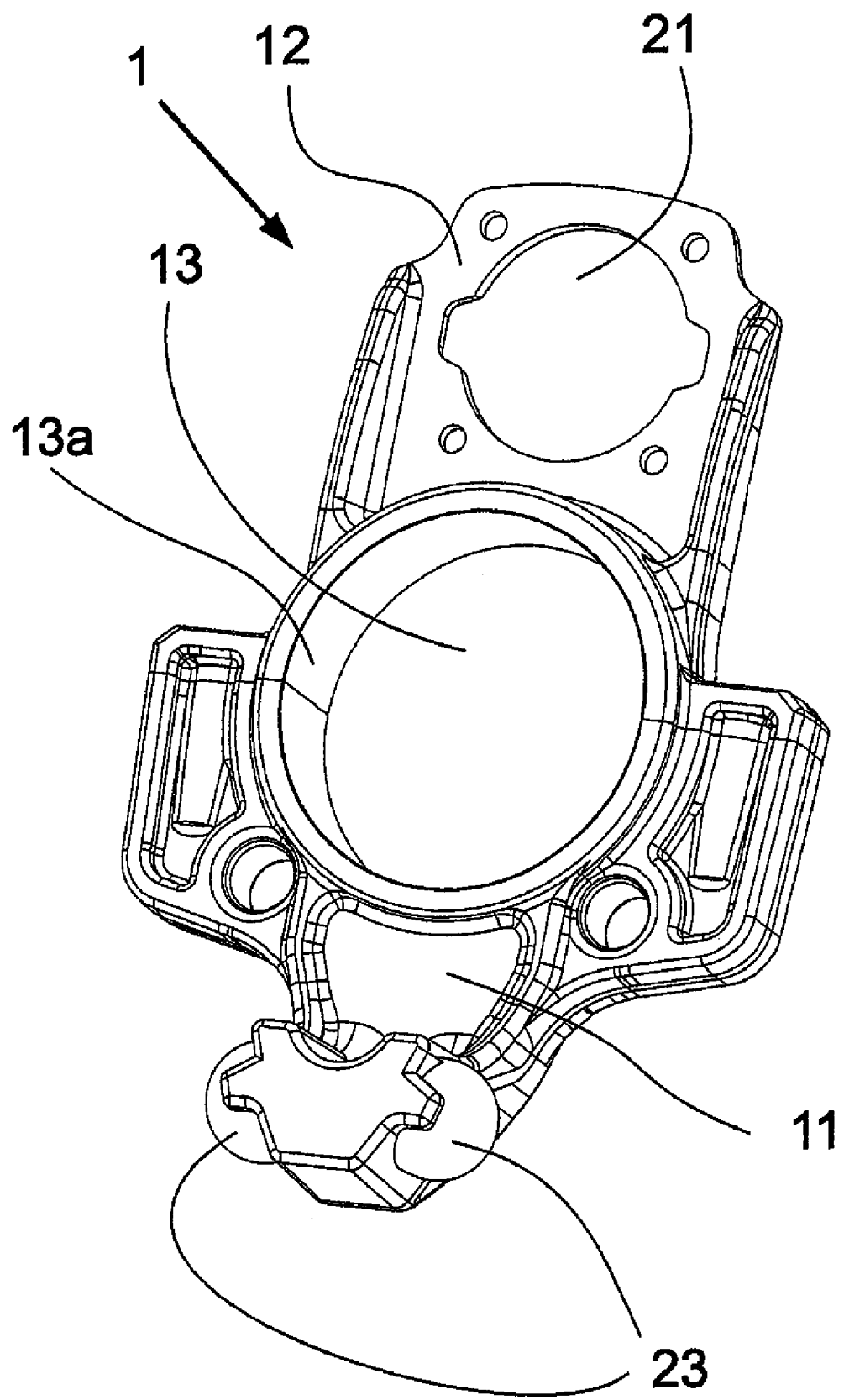
FIG. 5 is an isometric view of a twice divided brake support plate for arranging the components of a drum brake according to another aspect of the present invention.

Finally, FIG. 5 shows the twice divided brake support plate 1 for accommodating the components of a drum brake, where in regard to the preceding figures the same parts have been given the same reference numbers, and therefore we shall not discuss their configuration in detail at this time.

For the fastening of the components of a drum brake (not shown), a plurality of fastening openings and bearing sites is arranged on the brake support plate 1, in order to fasten or movably support these components. Basically, this involves the accommodation of the bearing system 21 of the activation shaft, which is preferably designed as an S-shaped cam shaft. This bearing system 21 itself consists of a material which is suitable for plain bearings and it is inserted in the corresponding fastening opening, or it consists of a self-standing unit which is fastened to the brake support plate 1. Furthermore, sensors can be fastened to the brake support plate 1, such as sensors for the antilock system or for detection of wear or temperature.

Furthermore, such a design of the brake support plate 1 has a bearing system 23 for the brake shoes of the drum brake, so that the brake shoes can move when activated by the activating shaft. The bearing system 23 is preferably designed as a spherical bearing. However, any other bearing allowing for a swivel movement of the brake shoes can also be used.

Figure 6:
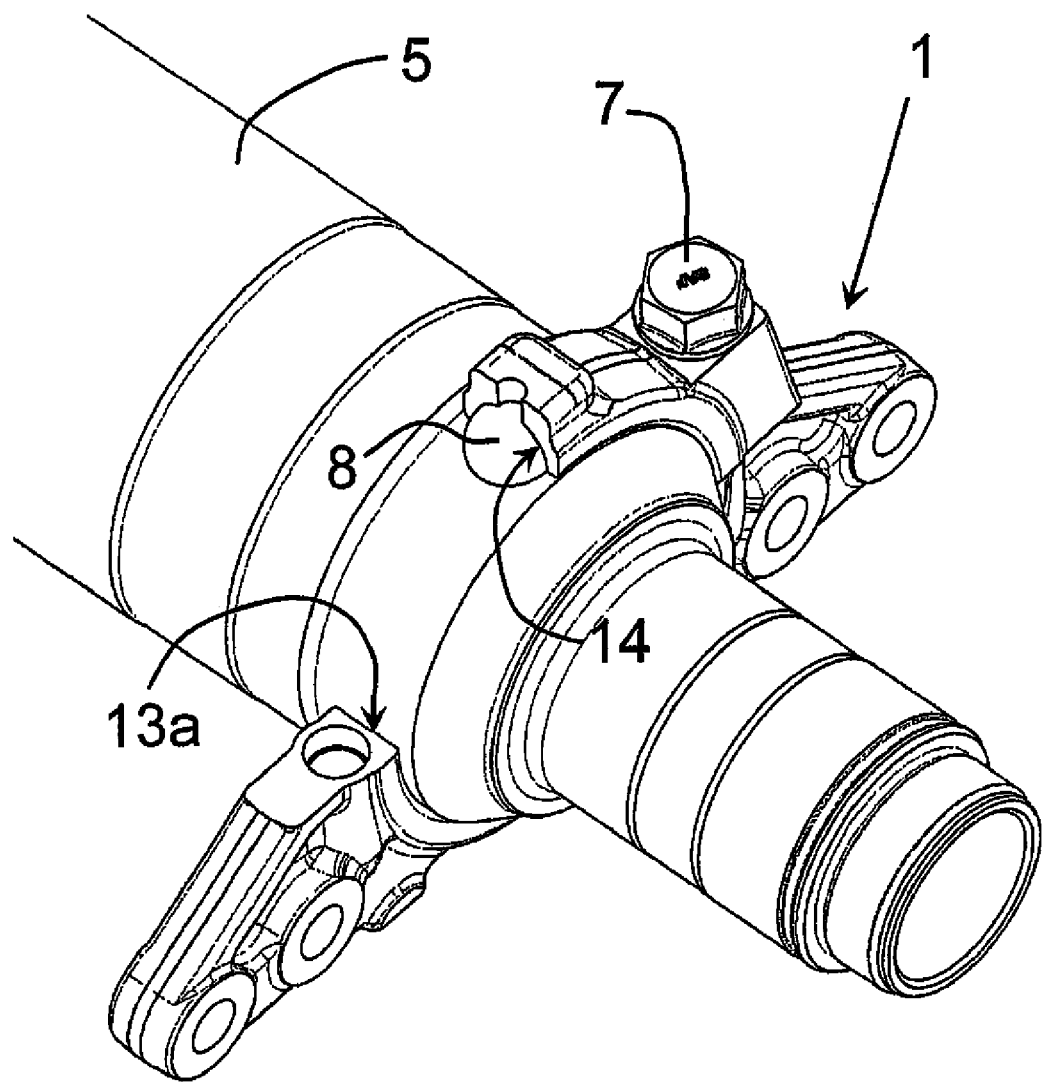
FIG. 6 is an isometric view of a brake support plate according to another aspect of the present invention.

For an advantageously improved transmission of torques, FIG. 6 shows a configuration of the brake support plate 1 with an engaging means 8, which engages with corresponding recesses in brake support plate and axle element 5. Moreover, a centering of the brake support plate 1 is made possible, both in the axial and the tangential direction.

The first engaging means 14 is preferably configured as a recess in the brake support plate 1. The latter is designed to at least partly accommodate the second engaging means 8. The recess can have any desired configuration, and the surface geometry can be straight and/or curved. Especially advantageously, however, the first engaging means 14 fashioned as a recess has an essentially spherical configuration, so as to at least partly accommodate an essentially spherically shaped second engaging means 8.

The second engaging means 8 can be configured as a single piece with the axle element 5. Advantageously, however, it is configured as a separate ball (see FIG. 6), which is let into a recess in the axle element 5. Of course, the second engaging means 8 alternatively can also be configured in the brake support plate 1, i.e., arranged or secured in the first engaging means 14, configured as a recess. Moreover, alternatively, the ball (i.e., the second engaging means) can also be configured as a single piece with the brake support plate 1.

The invention claimed is:

1. A method for the production and mounting of a brake support plate, the method comprising:
   providing an axle defining an outer surface portion having an original size when the axle is in a substantially unstressed state;
   fabricating a brake support plate blank including an axle opening having a size and defining a periphery;
   machining the axle opening to form an engagement surface;
   creating a discontinuation at the periphery of the axle opening by breaking the brake support plate blank in at least one place:
   increasing the size of the axle opening;
   positioning the axle in the axle opening;
   reducing the size of the axle opening to an assembled size such that a frictional connection is achieved over substantially the entire engagement surface.

2. The method of claim 1, wherein:
   the brake support plate is interrupted at two places to form a brake support plate comprising two segments.

3. The method of claim 1, further including:
   forming at least one engagement structure at the periphery of the axle opening;
   forming a second engagement structure on the axle;
   engaging the first and second engagement structures to position the brake support plate relative to the axle.

* * * * *